Feb. 22, 1955     W. H. NORDENSON     2,702,724
VARIABLE TREAD WHEEL
Filed March 23, 1954     2 Sheets-Sheet 1
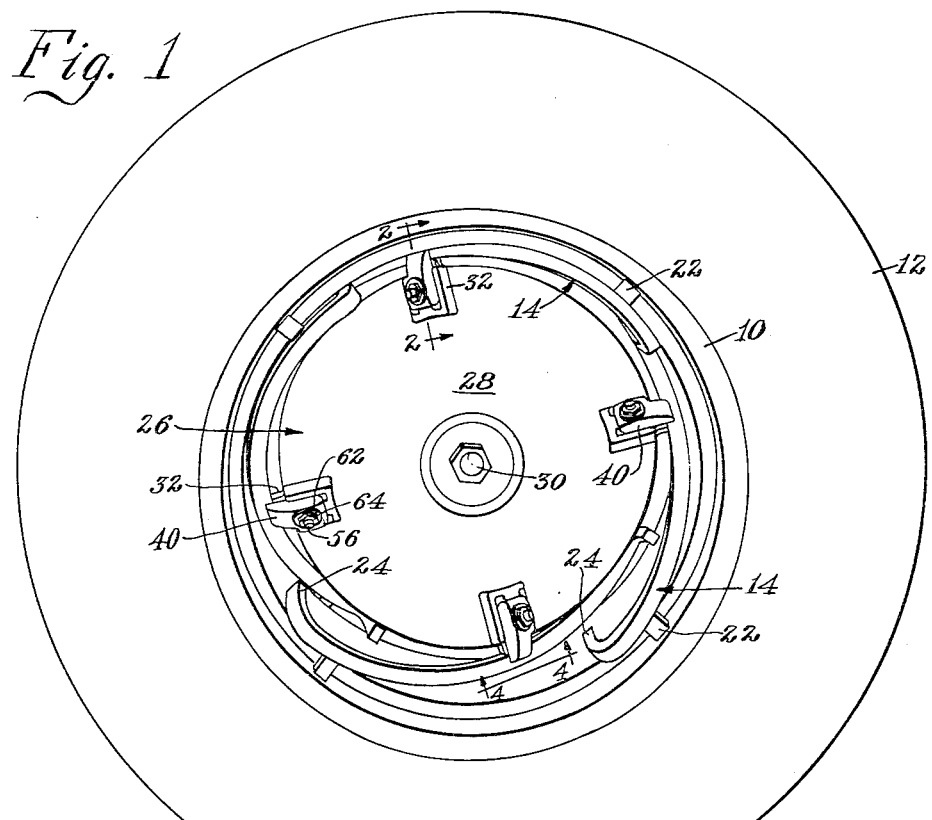
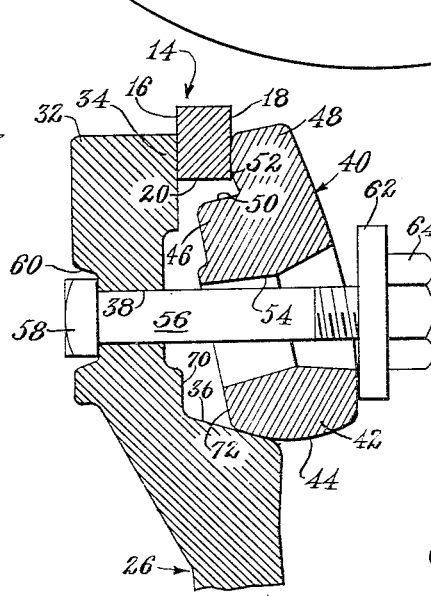
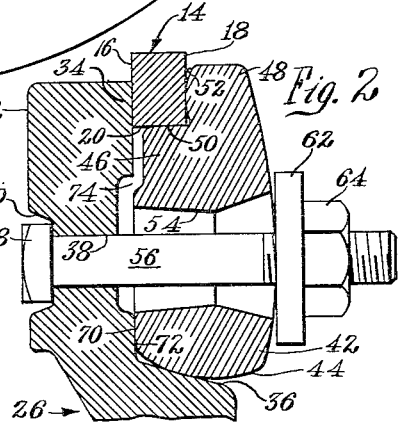
INVENTOR.
W. H. Nordenson Feb. 22, 1955　　　W. H. NORDENSON　　　2,702,724
VARIABLE TREAD WHEEL
Filed March 23, 1954　　　　　　　　2 Sheets-Sheet 2
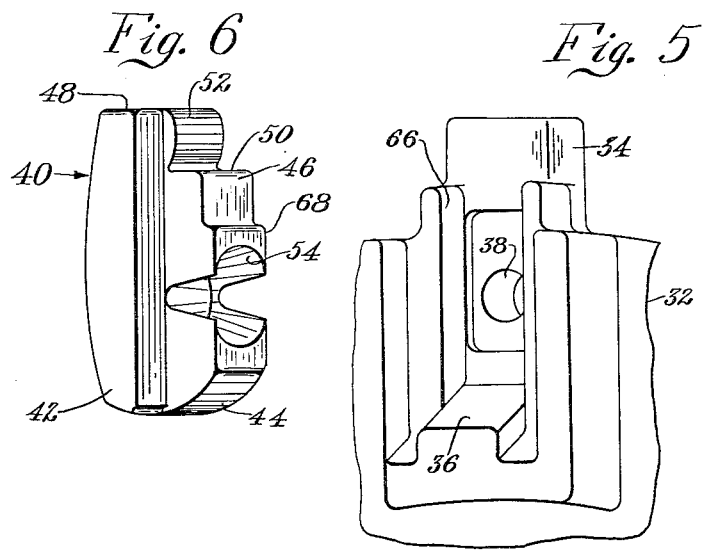
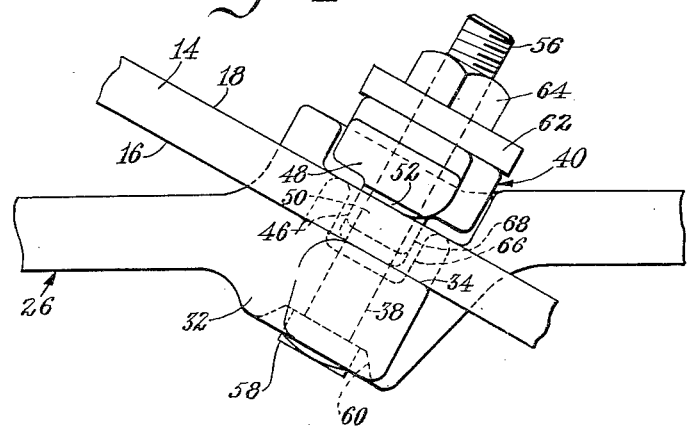
INVENTOR.
W. H. Nordenson
Attorneys United States Patent Office 2,702,724
Patented Feb. 22, 1955

2,702,724

VARIABLE TREAD WHEEL

Willard H. Nordenson, Dubuque, Iowa, assignor to Deere Manufacturing Co., Dubuque, Iowa, a corporation of Iowa Application March 23, 1954, Serial No. 418,048

5 Claims. (Cl. 301—9)

This invention relates to a vehicle wheel and more particularly to a variable tread wheel of the type such as is used in pairs on an agricultural tractor for varying the lateral spacing between the traction wheels.

The problem of variation in tread of wheels in an agricultural tractor is probably more acute than in any other art, because of the desirability of coordinating the wheel spacing with the row spacing of the particular crops being cultivated or harvested. In the distant past, tread variations were accomplished by various methods, most of them requiring considerable manual labor lessened to no extent by the use of larger and larger wheels equipped with pneumatic tires. The simplest prior art design is one in which the wheel body has a peripheral rim-engaging portion offset axially with respect to the portion of the rim that it engages, so that the rim could be removed and reversed and then repositioned on the wheel body with the offset axially in the other direction. Interchangeability of a rim of this type from one side or the other of the wheel would normally produce four positions for each wheel. Subsequently, as evidenced in such U. S. patents as those to Brown 1,967,283 and 2,099,194, it was proposed to utilize externally threaded axles and internally threaded hubs so that wheel adjustment could be accomplished by power, which required utilization of the differential driving mechanism common to all agricultural tractors.

As a more recent variation on the above, there are now available for use on tractors wheel assemblies in which the rim includes a plurality of peripherally arranged, radially inwardly projecting ribs generally in the form of uniformly circumferentially and axially spaced elongated sections of a helix about the rim axis. The wheel body has a plurality of mounting elements, equal in number to the ribs and uniformly circumferentially spaced on the order of the rib spacing so that one element is associated with each rib. The wheel is assembled by the utilization of a plurality of securing means clamping the mounting elements respectively to the ribs so that the wheel body and rim may rotate in unison. If it is desired to change the axial relationship between the wheel body and the rim, the securing means are released and power is applied to the driving axle on which that wheel is fixed, the other axle being braked by the associated one of the pair of brakes conventionally provided on the tractor. Because of the engagement of the wheel with the ground, sufficient resistance to forward movement is set up so that the wheel rotates inside the rim and the mounting elements serve as runners that travel circumferentially and axially of the ribs, thus axially offsetting still further the plane of the wheel as respects the plane of the rim. The process is repeated at the other side of the tractor and a new tread or lateral wheel spacing is accomplished. As representative of one known form of a wheel assembly of the character just described, reference may be had to the U. S. patent to Strehlow 2,417,139.

One of the biggest disadvantages in a wheel assembly of the type just referred to stems from the difficulty of obtaining the necessary clamping action between the wheel body and the rim. A clamp that would be considered desirable is one that prevents relative movement of the wheel body and rim so that the two may rotate in unison during operation of the tractor; yet, the clamp must be readily releasable so that axial adjustment may be achieved. It has been determined that a fairly satisfactory clamping action will be obtained if radial as well as axial forces are exerted by the clamps, thus producing what is known as "chording" of the rim. For example, in a wheel assembly in which the rim has four ribs and the wheel body has four mounting elements, the mounting elements are spaced uniformly angularly so that radial outward expansion gives somewhat the effect of a square circumscribed by the rim, each corner of the square theoretically distorting the rim and increasing the intensity of the grip of the wheel body on the rim. In the above-mentioned Strehlow patent, this result is achieved by eccentrics. It has been found, however, that although these eccentrics produce the desired gripping action, they sometimes "freeze" and very often are impossible to release. These difficulties flow largely from accumulation of dirt, rust and other foreign matter as well as from cumulative manufacturing errors, such as a plus tolerance on one part and a minor tolerance on the other. Essentially, an eccentric mechanism as applied to a wheel assembly of this type has limited rotary movement and therefore the mechanical advantage is not always sufficient for the purposes intended.

According to the present invention, an improved clamp is provided that achieves both axial and radial forces in a manner accomplishing all of the foregoing results without including any of the disadvantages. Fundamentally, the improved clamp comprises a wheel body having thereon a plurality of mounting elements, each including a ramp sloping outwardly and downhill as respects the axis of the wheel. Each clamp has a convex base so that it may rock on the element ramp and at its radially outer portion has a pair of rib-engaging parts, one of which engages the outboard side of the rib and the other of which engages the arcuate inner edge of the rib. The clamp is secured to its associated mounting element by securing means for exerting a generally axially compressive force that draws the clamp into position with the rib between the clamp and the element. Because of the rockable base, the clamp may rock on the ramp and may also move uphill on the ramp, simultaneously exerting both radially and generally axially directed forces. It is a further object of the invention to increase the efficiency of the clamping action by providing on the element and the clamp cooperative rib-engaging parts engageable respectively with the inboard and outboard sides of the rib in a flatwise manner so as to distribute the clamping action over a wider area. In furtherance of this object, the clamping means exerts a force in a direction perpendicular to the length of the rib rather than perpendicular to the plane of the wheel body. Thus, the clamping action achieves the desired "chording" but does not distort the rim in a lateral direction.

The foregoing and other important objects inherent in and encompassed by the invention will appear as a preferred embodiment of the invention is disclosed in the following specification and accompanying sheets of drawings, the figures of which are briefly described below.

Fig. 1 is a side elevational view of a wheel assembly embodying the invention.

Fig. 2 is a fragmentary sectional view, on a materially enlarged scale, as seen along the line 2—2 of Fig. 1.

Fig. 3 is a similar sectional view showing one phase of the assembly of the components.

Fig. 4 is an elevational view on the scale of Figs. 2 and 3, as seen substantially along the line 4—4 of Fig.1.

Fig. 5 is a perspective view of one of the mounting elements on the wheel body.

Fig. 6 is a perspective view of one of the clamps.

In the following description, as well as in the appended claims, reference will be had to the wheel as having inboard and outboard portions, but it will be understood that these expressions are used as terms of convenience and not of limitation. The same applies to description of the rim-carried ribs as sections of a helix, for in many instances these ribs may be made substantially straight but the same results will be achieved.

The wheel assembly chosen for the purposes of illustration appears in its entirety in Fig. 1 and will be seen to comprise a rim 10 on which is mounted a conventional pneumatic tire 12. The wheel, as in the case of the Strehlow patent referred to above, is provided about its inner periphery with a plurality of radially inwardly projecting ribs 14 generally in the form of uniformly circumferentially and axially spaced elongated sections of a helix about the rib axis. For purposes of convenience in the later description, each rib will be referred to as having an inboard side 16, an outboard side 18 and an arcuate inner edge 20. Each rib may be conventionally rigidly affixed to the rib as by welding via spacers 22 and via angularly related opposite end portions 24. These end portions serve, in a manner understood by those skilled in the art, as limit means for preventing complete separation of the rim from the wheel body.

The improved wheel body is designated generally by the numeral 26 and has a central part 28 apertured to receive an axle 30 and a peripherally outer part including a plurality of mounting elements 32. Since the mounting elements are identical, only one will be described. It should be noted, however, at this point, that a wheel assembly could be provided utilizing fewer than the several identical rib-mounting means shown here, all within the spirit and scope of this invention.

Each element 32 is integral with the central part 28 of the wheel and projects radially outwardly therefrom so as to be surrounded by the general periphery including the ribs 14. The radially outermost portion of the element establishes an abutment 34 for engaging the inboard side 16 of the associated rib 14. It will be understood that the elements 32 are generally coplanar, whereas the ribs 14 are spiral and lead in a direction transverse of the plane of the wheel as a whole. These details are established in the Strehlow patent and need no further description here.

Each element 32 is provided, radially inwardly of the associated rib 14, with a ramp 36 that extends generally axially beyond the outboard side 18 of the rib 14 and downhill as respects the axis of the assembly. As shown in Fig. 4, the element 32 is circumferentially shorter than the associated rib 14 and the face on the abutment 34 is parallel to the rib so as to engage the inboard side 16 of the rib in a flatwise manner, thus distributing the engagement pressure over a relatively wide area but in keeping with the over-all idea of obtaining maximum axial adjustment without unduly increasing the length of each rib. The element 32 has an aperture 38 therein on an axis perpendicular to the rib 14 but included in a cylinder generated about the wheel axis. The purpose of this construction will be set forth later.

The wheel assembly includes a plurality of clamps, each designated generally by the numeral 40. Since these are identical, only one will be described, subject to the observation made above relative to the possibility that fewer than the illustrated number of clamps may be used. Each clamp has a base 42 provided with a convex undersurface 44 formed about an axis generally parallel to the length of the rib 14. The clamp is preferably of one-piece construction and thus includes integrally therewith first and second rib-engaging parts 46 and 48. The part 46 comprises a step or offset that presents a circumferentially directed surface 50 engageable with the arcuate inner edge 20 of the associated rib 14. The part 48 projects radially beyond the surface 50 and has a radial convex face 52 engageable with the outboard side 18 of the associated rib 14. The clamp is apertured at 54 to receive a bolt 56 that is passed through the element aperture 38. The bolt has a square head 58 received in a square recess 60 to prevent turning of the bolt. When the clamp is assembled in position on its associated element, the aperture 54 registers with the element aperture 38 and it may be said that the two apertures are formed on a common axis perpendicular to the rib as previously explained. The aperture 54 is made somewhat larger than the diameter of the bolt so that the clamp may have movement as will be hereinafter described. As in the case of the abutment surface 34 on the element 32, the rib-engaging parts 46 and 48 of the clamp are circumferentially shorter than the associated rib 14 but are of sufficient width, consistent with the requirements previously outlined, to distribute rib-engaging forces over a relatively wide area. The securing means, part of which consists of the bolt 56, is completed by a washer 62 and a nut 64. It will be appreciated that there are a plurality of securing means, one for each element-clamp assembly.

As best shown in Fig. 5, the element 32 has a generally axially inwardly directed pocket 66 and the clamp (Fig. 6) has a generally axially inwardly directed projection 68 receivable in the pocket. The cooperation between the pocket 66 and projection 68 facilitates initial location of the clamp relative to its element. The outboard face of the element 32 in close proximity to the ramp 36 serves as a stop 70 cooperative with a stop portion 72 on the clamp to limit uphill movement of the clamp on the ramp to a predetermined maximum. At the same time, the radially outer portions of the element and clamp are so shaped as to permit the presence of a generally axial space 74 therebetween after tightening of the securing means has caused engagement of the stops 70 and 72. Thus, even though radially outwardly directed forces are cut off at a predetermined maximum, generally axially directed forces are still available upon tightening of the securing means.

The use of the improved clamping means will be apparent from Figs. 2 and 3. When the clamp is first assembled relative to the element, the nut is backed off so as to permit considerable interplay between the two components. In one initial position, the clamp may assume the status shown in Fig. 3, with the convex surface 44 of the base 42 resting on an outboard portion of the element ramp 36. In this position of the clamp, its convex rib-engaging surface 52 engages the outboard side of the rib 14. Depending upon the manner of assembly, the clamp may occupy a position rocked somewhat from that shown in Fig. 3; that is to say, lower portion or base 42 of the clamp may be farther inwardly on the ramp 36 with the rib-edge-engaging surface 50 of the clamp in engagement with the edge 20 of the rib, which will mean that the surface 52 may be spaced outboardly of the rib 14. Nevertheless, in either event, when the nut 64 is drawn up, the clamp 40 is caused to move in an inboard direction. It is expected that initial engagement of the cooperating surfaces will be such that, assuming the situation in Fig. 3, the radial convex surface 52 on the rib-engaging part 48 of the clamp 40 will contact the outboard side 18 of the rib and will thus serve as a sliding fulcrum about which the clamp may pivot bodily as the convex surface 44 of the base 42 rides uphill on the ramp 36. In a position just short of the ultimate position shown in Fig. 2, all surfaces will theoretically be in contact, with the exception that the stops 70 and 72 will be spaced apart. Consequently, further tightening of the nut 64 will cause the clamp to ride farther uphill on the base 36, and the resulting component will be radially outwardly so that the rib-engaging part 46 more tightly engages the rib 14 at its inner edge 20. In other words, the radially outwardly directed force is intensified as the clamp moves uphill on the ramp 36. At the same time, the generally axial force imposed on the assembly by tightening of the securing means increases the clamping action between the radial convex surface 52 and the outboard side 18 of the rib 14. However, as the radial force increases, it will have a tendency, in cooperation with the other clamps, to "chord" the rib, which is what is desired. When the predetermined maximum amount of "chording" is accomplished, the stops 70 and 72 will engage. Thereafter, clamping action will be limited to that between the convex face 52 and the outboard side 18 of the rib. The force intensified here is relatively static and cannot distort the rib or the rim associated therewith.

Since the securing means is of the screw-threaded type, there is a considerable angular or rotary range in which a clamping effect may be obtained, as distinguished from the limited 180° range known in the art. Consequently, the limits on tightening and loosening of the securing means are farther apart and if for some reason the clamp does not release upon mere loosening of the nut 64, the bolt can be removed and the clamp can be pried outwardly, which is impossible in the heretofore known "built-in" clamps. Moreover, as previously indicated, the compressive force is directed along a line normal to the rib 14 rather than normal to the plane of the wheel as a whole. This distributes the forces over relatively wider areas and increases the clamping action without materially enlarging the clamping surfaces.

When it is desired to release the clamp so that adjustment of the wheel may be obtained, the nuts 64 are merely backed off and it is expected that the inherent resiliency in the parts will effect quick release of the clamps. With the clamps in a released position somewhat midway between the positions of Figs. 2 and 3, the rib-engaging surfaces 50 on the clamp parts 46 serve as runners that ride peripherally along the ribs 14 as adjustment is effected. When the next stage of adjustment is accomplished, the clamps may be tightened as previously explained.

The convex surface at 52 is important from the standpoint of achieving line contact with the outboard side 18 of the rib at all times, regardless of whether the clamp is stationary as respects the rib or whether the clamp fulcrums on the surface 52 relative to the rib. Likewise, line contact is achieved at all times between the convex surface 44 on the base 42 of the clamp and the element ramp 36, regardless of the position of the clamp as respects the element. Surface-to-surface contact is achieved at 20—50, once the clamp is seated and tightening of the securing means intensifies the surface-to-surface contact, which is important from the standpoint of "chording" the rim. In the event of undue distortion or bending of any of the bolts 56 because of excessive driving torque, the cooperation between the element pocket 66 and the clamp projection 68 will prevent relative angular movement beyond a predetermined limit.

Various features of the invention not specifically enumerated herein will undoubtedly occur to those versed in the art, as will many modifications and alterations in the preferred embodiment of the invention disclosed, all of which may be effected without departing from the spirit and scope of the invention.

What is claimed is:

1. For a variable-tread vehicle wheel assembly of the type including a rim provided about its inner periphery with a plurality of radially inwardly projecting ribs generally in the form of circumferentially and axially spaced elongated sections of a helix about the rim axis, each rib having parallel inboard and outboard sides and an inner arcuate edge: a wheel including a central wheel body concentrically positionable as respects the rim, a plurality of mounting elements rigid on the wheel body in circumferentially spaced relation on the order of and equal in number to the ribs so that each element is associated with a rib, each element having integral therewith a radially outwardly projecting abutment circumferentially shorter than the associated rib and engageable with a portion of the inboard side of the rib, each element having a ramp thereon radially inwardly of the associated rib and projecting aixally outwardly and downhill as respects the wheel axis; a plurality of rib clamps equal in number to and respectively having bases seating on the element ramps, each clamp having an integral first part projecting radially outwardly from the base and circumferentially shorter than the associated rib and having a circumferentially directed surface, engageable with a portion of the inner arcuate edge of that rib and an integral second part projecting radially beyond the first part and having a radial face circumferentially shorter than the associated rib and engageable with a portion of the outboard side of that rib in opposed relation to the associated element abutment, each base being convex generally about an axis parallel to the associated rib and thus rockable on the associated ramp selectively toward and away from the rib; and releasable securing means cooperative between each mounting element and its associated clamp for drawing the clamp toward the element to cause the clamp to partake of both rocking and uphill sliding movement on the ramp for simultaneously intensifying both radially outward and generally axially inward pressures exerted on the respective rib portions by the first and second rib-engaging parts of the clamp.

2. The invention defined in claim 1, in which: the radial face on the second rib-engaging part is convex generally about an axis parallel to the associated rib to achieve a combined rocking and sliding contact with the outboard side of the associated rib as the clamp moves uphill on the ramp.

3. The invention defined in claim 1, in which: each mounting element and its associated clamp have registering apertures coaxial on an axis perpendicular to the associated rib but included in a cylinder about the wheel axis; each securing means passes through the associated registering apertures to exert a compression force along the axis of said apertures; and the abutment on each mounting element and the radial rib-engaging face on each clamp are respectively parallel to the inboard and outboard sides of the associated rib to engage said sides flatwise.

4. The invention defined in claim 1, in which: each mounting element has a generally axially inwardly directed pocket and each clamp has a generally axially inwardly directed projection receivable by the associated pocket.

5. The invention defined in claim 1, in which: each mounting element and its associated clamp have engageable stop portions in close proximity respectively to the ramp and base to limit uphill movement of the base of the clamp to a predetermined maximum and said clamp and mounting element being respectively shaped adjacent associated radially outward portions thereof in such manner as to leave a generally axial space therebetween after engagement of said stop portions.

References Cited in the file of this patent

UNITED STATES PATENTS

| | | |
|---|---|---|
| 2,027,408 | Walther | Jan. 14, 1936 |
| 2,270,918 | Ash | Jan. 27, 1942 |
| 2,417,139 | Strehlow | Mar. 11, 1947 |